United States Patent [19]

Payton et al.

[11] Patent Number: 5,779,785
[45] Date of Patent: *Jul. 14, 1998

[54] STABILIZED, HIGH SOLIDS, LOW VISCOSITY SMECTITE SLURRIES, AND METHOD OF PREPARATION

[75] Inventors: James Payton, Marietta; Nicholas Canaris, Atlanta; Jorge Miranda, Marietta, all of Ga.

[73] Assignee: Vinings Industries, Inc., Atlanta, Ga.

[*] Notice: The term of this patent shall not extend beyond the expiration date of Pat. No. 5,407,400.

[21] Appl. No.: 619,675

[22] PCT Filed: Sep. 23, 1994

[86] PCT No.: PCT/US94/10770

§ 371 Date: Mar. 29, 1996

§ 102(e) Date: Mar. 29, 1996

[87] PCT Pub. No.: WO95/09135

PCT Pub. Date: Apr. 6, 1995

Related U.S. Application Data

[63] Continuation-in-part of Ser. No. 129,416, Sep. 30, 1993, Pat. No. 5,407,480.

[51] Int. Cl.$^6$ .............................. C04B 33/02; C09C 1/42; C09C 3/08
[52] U.S. Cl. ................... 106/487; 106/486; 106/416; 106/DIG. 4; 501/146; 501/148
[58] Field of Search .......................... 106/416, 487, 106/486, DIG. 4; 501/145, 146, 148

[56] References Cited

U.S. PATENT DOCUMENTS

| | | |
|---|---|---|
| 3,080,256 | 3/1963 | Bundy. |
| 3,252,757 | 5/1966 | Granquist. |
| 3,298,849 | 1/1967 | Dohman et al.. |
| 3,586,478 | 6/1971 | Neumann. |
| 3,594,203 | 7/1971 | Sawyer et al.. |
| 3,666,407 | 5/1972 | Orlemann. |
| 3,671,190 | 6/1972 | Newuman. |
| 3,844,978 | 10/1974 | Hickson. |
| 3,844,979 | 10/1974 | Hickson. |
| 3,852,405 | 12/1974 | Granquist. |
| 3,855,147 | 12/1974 | Granquist. |
| 3,892,587 | 7/1975 | Abercrombie, Jr.. |
| 3,961,979 | 6/1976 | Abercrombie, Jr.. |
| 4,017,324 | 4/1977 | Eggers. |
| 4,078,941 | 3/1978 | Bundy. |
| 4,118,246 | 10/1978 | Horzepa et al.. |
| 4,359,339 | 11/1982 | Van Fisk et al.. |
| 4,695,402 | 9/1987 | Finlayson et al.. |
| 5,015,334 | 5/1991 | Derrick. |
| 5,057,467 | 10/1991 | Croft. |
| 5,075,033 | 12/1991 | Cody et al.. |
| 5,223,098 | 6/1993 | Cluyse et al.. |
| 5,266,538 | 11/1993 | Knudson et al.. |
| 5,279,664 | 1/1994 | Robinson et al.. |
| 5,407,480 | 4/1995 | Payton et al.. |

FOREIGN PATENT DOCUMENTS

| | | |
|---|---|---|
| 0 485 124 | 5/1992 | European Pat. Off.. |
| WO 92/11218 | 7/1992 | WIPO. |
| WO 92/15396 | 9/1992 | WIPO. |

*Primary Examiner*—Michael Marcheschi
*Attorney, Agent, or Firm*—Klauber & Jackson

[57] ABSTRACT

An aqueous slurry of smectite clay of elevated solids content, comprising an aqueous solution or emulsion of at least 0.2% by weight of said slurry of a salt of a low molecular weight amine salt, in which is dispersed from about 10 to 47% by weight of the slurry, of a smectite clay. The amine salt is effective to prevent the smectite from swelling appreciably, whereby the slurry can be shipped and stored without creating a gelling problem. The inhibiting or suppressing effect of the amine salt on the swelling of the clay and on gelling of the slurry is reversible upon subsequent dilution with water, thereby facilitating use of the smectite in typical applications, e.g. as a retention aid in paper making, or as a viscosifier.

33 Claims, No Drawings

STABILIZED, HIGH SOLIDS, LOW VISCOSITY SMECTITE SLURRIES, AND METHOD OF PREPARATION

CROSS REFERENCE TO RELATED APPLICATIONS

This application corresponds to International Application No. PCT/US94/10770 filed 23 Sep. 1994 (pending, published 6 Apr. 1995) and is a continuation-in-part of application Ser. No. 08/129,416 filed Sep. 30, 1993 and issued as U.S. Pat. No. 5,407,480 on Apr. 18, 1995.

FIELD OF THE INVENTION

This invention relates generally to smectite clays, and more specifically relates to aqueous low viscosity smectite clay slurries of elevated solids content, and to a method for producing same which while suppressing swelling of the smectite in the high solids slurry, enables the normal viscosifying and other properties of a swelled smectite to be restored at the point of slurry use.

BACKGROUND OF THE INVENTION

Smectite clays are phyllosilicates of the 2:1 layered type. The smectite group includes inter alia the mineral subgroups montmorillonite, beidellite, nontronite, saponite, hectorite and sauconite. Among the smectite clays to which the present invention is applicable are the naturally occurring Wyoming variety of swelling bentonite and similar clays, and hectorite, which is a swelling magnesium-lithium silicate. For use in the invention, these clays are preferably converted to the sodium form if they are not already in this form. This can be effected by a cation exchange reaction with a soluble sodium compound. These methods are well-known in the art.

Smectite-type clays prepared synthetically can also be used in the slurries of the invention. Representative of such clays are montmorillonite, bentonite, beidellite, hectorite, saponite and stevensite. Representative hydrothermal processes for preparing synthetic smectites are described in U.S. Pat. Nos. 3,252,757 to Granquist; 3,586,478 to Neumann; 3,666,407 to Orlemann; 3,671,190 to Neumann; 3,844,978 and 3,844,979 to Hickson; and 3,852,405 and 3,855,147 to Granquist.

Smectite clays are commercially important minerals. Appropriately processed, smectite clays are excellent viscosifiers, binders, film formers, fabric softeners and retention aid additives in paper making. These clays are platey-type materials having a micaceous structure. They are highly colloidal and readily swell in water to form viscous, thixotropic gels which renders the clays useful as viscosity builders in many industries and applications including, for example, in foundry molding compositions, as suspension aids in agricultural sprays, and for thickening cosmetics. The high surface area generated by swelling in water also makes these clays useful in fabric softening and in paper making applications. In the latter environment smectite clays are particularly useful as retention aids. In such use it is often of interest to intermix an aqueous slurry of the smectite clay with a cellulosic suspension, and thereafter drain the cellulosic suspension.

Most smectite clays are sold as fine powders. As with most minerals, however, these powders are difficult and expensive to handle. They also are subject to considerable "dusting", i.e. to evolution of dust during handling, so that they can in some cases cause environmental problems, and even health risks. To minimize these problems and to provide the user of the mineral with a product which is more ready for the user's application, many minerals are sold or shipped by the manufacturer or distributor as high solids aqueous slurries. Such high solids slurries can be easily stored, shipped, transferred, e.g. pumped and metered, with significantly less capital expenditure and many fewer problems than are associated with dry mineral powders.

In most applications, nevertheless, it is not economical or practical to ship smectite clays as aqueous slurries because of the large quantity of water normally required in such slurries. This problem arises because smectites are indeed good viscosifiers, whereby it has not generally been possible to produce high solids aqueous slurries by the usual methods. In general, only about 8%–10% solids slurries of good quality swelling smectite can be produced in water, and at solids contents greater than about 10%, the viscosities of the slurries can become so high that they cannot readily be pumped by conventional equipment and gelling upon standing becomes a problem.

Thus, there is a need for aqueous slurries containing substantially greater than 10% by weight of smectite clay, which have viscosities low enough to allow pumping. At the same time the high solids slurry must retain the smectite in a form in which it can be readily activated, i.e. to restore the normal properties associated with a swelled bentonite, such as the viscosifying properties, and the ability to effectively function as a retention aid in paper making.

Among the prior art that is pertinent to the present invention are the following:

Van Fisk, U.S. Pat. No. 4,359,339 proposes the addition of water soluble aluminum salt, such as aluminum sulfate, to permit the making of pumpable aqueous slurries of bentonite of up to 26% by weight of clay, primarily for use in making foundry sand compositions used in the making of molds. While apparently suitable for the purpose disclosed, aluminum salts have not been found to be satisfactory for making smectite clay slurries of higher solids content, which are frequently desired for many purposes, especially when shipping is involved. Van Fisk also points out that certain other ions, such as calcium ion have been known to depress the gelling properties of bentonites in aqueous slurries, but that the properties are not readily reversible upon later dilution, thus limiting the value of such use. While aluminum ion appears to be less subject to this objection, to a considerable extent it suffers from the same problem. All multivalent cations tend to strongly bind the clay platelets together, which prevents dispersion and inhibits performance in applications where good dispersion is needed (viscosifiers, fabric softeners, paper making retention aids).

In recently published International Application, WO92/11218, a smectite clay is provided as an elevated solids aqueous slurry, e.g. up to 50% solids, which is composed of the smectite clay slurried or dispersed in water containing an effective concentration of a monovalent salt. When such a salt is present in the clay slurry, the clay does not swell appreciably, is essentially inactive, and the slurry can be shipped and stored without creating a gelling problem. When this slurry is diluted with fresh water at the point of application to make it of the desired solids content for use, the smectite clay is activated and exhibits the desired properties, such as viscosity, retention, etc.

A concept similar to that of WO92/11218 is disclosed in Cluyse et al., U.S. Pat. No. 5,223,098. Bentonite swelling clay is provided to a paper making mill as a fluid concentrate containing more than 15% bentonite. Swelling of the bentonite is suppressed by an inorganic electrolyte in the concentrate. The bentonite swells upon dilution either before addition of the cellulosic suspension or after addition. While both WO92/11218 and U.S. Pat. No. 5,223,098 therefore disclose high solids smectite slurries which meet the needs above discussed, they are nonetheless sharply focused on use of certain inorganic electrolytes, which can introduce undesired ionic species into the smectite slurry. Furthermore, the efficacy of these salts for use as reversible swelling suppressants at higher smectite solids can be undesirably limited.

In accordance with the foregoing, it may be regarded as an object of the present invention, to provide a method for preparing a time-stable low viscosity, high solids aqueous slurry of a swelling smectite clay.

It is a further object of the invention to provide a method as aforementioned, wherein the smectite reversibly is inhibited from swelling in the resultant slurry, whereby upon dilution in or with water at the point of use, the smectite can be easily reactivated and swollen to generate the large surface area needed for maximum performance in many applications.

It is a further object of the invention, to provide a smectite clay slurry of the foregoing character, which remains pumpable and shippable without prohibitive gelling even at elevated solids content—e.g. up to 47% clay solids.

It is a still further object of the present invention to provide an aqueous smectite clay slurry of up to 47% solids content, which is pumpable and shippable, and in which the swelling properties of the smectite can be readily restored during a typical use in paper making.

SUMMARY OF THE INVENTION

Now in accordance with the present invention, the foregoing objects, and others as will become apparent in the course of the ensuing specification, are achieved in an aqueous slurry of smectite clay of elevated solids content, comprising an aqueous solution or emulsion of at least 0.2% by weight of said slurry of a salt of a low molecular weight amine salt, in which is dispersed from about 10 to 47% by weight of the slurry, of a smectite clay. The amine salt is effective to prevent the smectite from swelling appreciably, whereby the slurry can be shipped and stored without creating a gelling problem. The inhibiting or suppressing effect of the amine salt on the swelling of the clay and on gelling of the slurry is reversible upon subsequent dilution with water, thereby facilitating use of the smectite in typical applications, e.g. as a retention aid in paper making, or as a viscosifier.

Although not sharply critical, the upper limit for the quantity of amine salt to be used in the invention is in general that level at which the time-stability of the slurry becomes appreciably impaired. This level varies somewhat depending on the specific smectite, the smectite solids content in the slurry, and with the particular amine; but preferably is not more than about 5% by weight of the slurry. As increasingly high levels of the salt are used, i.e. beyond the level of stability impairment, the slurry remains pumpable but the smectite tends to increasingly settle and separate, which creates a need for inconvenient mixing during transport or for such mixing before or during transfer of the slurry between containers or between the transport container and the utilization point.

The smectite clay can typically comprise a bentonite, such as a natural swelling Wyoming bentonite; or other natural and/or synthetic swelling smectites can be used. The slurry may further include up to 0.2% by weight of the slurry, of a wetting agent, such as a non-ionic surfactant. The low molecular weight amine is in general selected from one or more members of the group consisting of ethoxylated tallow amine, bis(2-hydroxyethyl) soyamine, bis(2-hydroxyethyl) cocoamine, tributylamine, N-benzylethanolamine, triethanolamine, methyliminobispropylamine, hexamethylenetetramine, diisopropylamine, 3,3'-iminobispropylamine, diisobutylamine, 2-(2-aminoethyoxy) ethanol, diethanolamine, biuret, 1-methyl-2-pyrrolidone, aniline, methylpyrrolidone, morpholine, ethanolamine, hydroxylamine, ethylenediamine, triethylenetetramine, diethylenetriamine, dimethylamine, and methylamine. Preferable amines include methylamine, dimethylamine, hydroxylamine, 2-(2-aminoethoxy)ethanol, aniline, and morpholine. The amine salt is preferably that of an acid selected from one or more members of the group consisting of hydrochloric acid, sulfurous acid, sulfuric acid, phosphoric acid, formic acid, acetic acid, hydroxyacetic acid, propionic acid, oxalic acid and citric acid; of these the acid is more preferably hydrochloric acid, formic acid, acetic acid, and/or hydroxyacetic acid. The slurry may further contain 0.1 to 15% polyacrylate polymer by weight, of a polyacrylate polymer having an average molecular weight of from 1,500 to 15,000 daltons.

Pursuant to the method of the invention a time-stable, low viscosity, high solids aqueous slurry of a swelling smectite clay is prepared, by first preparing an aqueous solution or emulsion of a salt of a low molecular weight amine wherein the salt comprises from about 0.5 to 13% by weight of the slurry, and then dispersing therein at least 10% by weight of a powdered smectite clay. The amine salt is effective to prevent the smectite from swelling appreciably, whereby the slurry can be shipped and stored without creating a gelling problem. The inhibiting effect of the amine salt on the swelling of the smectite and gelling of the slurry is reversible upon subsequent dilution with water. The aqueous salt solution or emulsion is preferably prepared as an initial step, and the smectite powder is then added thereto with mixing. The smectite is added to the solution or emulsion as from 10 to 47% by weight of the slurry.

The invention also resides in a method for shipping a swelling smectite clay from a shipping point to a utilization point such as a paper mill, and providing at the utilization point an aqueous swelled smectite slurry. A high solids, low viscosity shippable slurry is thus prepared at the shipping point, comprising an aqueous solution or emulsion of at least about 0.2% by weight of the shippable slurry of a salt of a low molecular weight amine, in which is dispersed at least 10% by weight of a powdered smectite. The amine salt is effective to prevent the smectite from swelling appreciably, whereby the slurry can be shipped and stored without creating a gelling problem, and the inhibiting effect of the salt on the swelling of the smectite and gelling of the slurry is reversible upon subsequent dilution with water. The slurry is shipped to the utilization point, and activated and swelled by diluting the high solids slurry with water. Dilution of the high solids slurry at the utilization point typically brings the smectite clay solids to the range of 0.01 to 10%. Where the utilization is in a paper making process, dilution of the slurry can be effected by adding the slurry to an aqueous cellulosic suspension which is being employed in the process, or by diluting the smectite slurry with water prior to its addition to the cellulosic suspension.

Smectite clays of the type which have been described in the Background portion of this specification are among those which may comprise the swelling smectite clay component of the aqueous slurries of the invention. In some instances these smectites may be modified by surface treatment to provide properties of special interest. For example, smectite clays that have been modified by reaction with low molecular weight (1,000 to 100,000 daltons), high charge density (4 to 24 meq/g) water soluble polymers of the anionic or cationic type can be used in the slurries to which the invention is applicable. Examples of suitable anionic high charge density water-soluble polymers are polyacrylic acid, polymethacrylic acid, polymaleic acid, polyvinyl sulphonic acids, polyhydroxy carboxylic acids, polyaldehyde carboxylic acids, alkyl acrylate/acrylic acid copolymers, acrylamide/ acrylic acid copolymers and salts of any of the above, for example, the alkali metal or ammonium salts of any of the above. Suitable cationic high charge density water-soluble polymers include polyethyleneimines, polyamidoamines, polyvinylamines, and polydiallyl ammonium compounds.

In the polymer modified clays, the low molecular weight, high charge density, water soluble anionic or cationic polymers are present in an amount of 0.5 to 25% based upon the dry weight of the clay. The polymer modification to the clay is facilitated by adding both the amine salt and the polymer to the water before the addition of the clay.

The preparation of polymer modified clays is disclosed in U.S. Pat. No. 5,015,334, which issued on May 14, 1991, and is incorporated herein by reference. The polymer modified clays are used as retention/drainage agents in paper or paperboard production. Polymer modified clays, such as taught in U.S. Pat. No. 5,015,334, are commercially available under the LAPOTAIN mark from Laporte Industries Ltd., London England, and from Vinings Industries, Inc., Atlanta, Ga.

Another synthetic analogue that is useful in the smectite slurries of the invention is the synthetic hectorite material that is commercially available under the trade names LAPO-NITE or LAPOMER from Laporte Industries Limited, London or Southern Clay Products, Inc., Gonzales, Tex.

The smectite swelling suppressant employed in the present invention is the salt of a low molecular weight amine. By the term "low molecular weight amine," as used herein, is meant a primary, secondary, tertiary or quaternary amine having a molecular weight within the range of about 31 to about 500 daltons. Such amines were used in preparing the examples shown in TABLES I and II herein. Illustrative of such amines are the following: ethoxylated tallow amine, bis(2-hydroxyethyl)soyamine, bis(2 hydroxyethyl) cocoamine, tributylamine, N-benzylethanolamine, triethanolamine, methyliminobispropylamine, hexamethylenetetramine, diisopropylamine, 3,3'-iminobispropylamine, diisobutylamine, 2-(2-aminoethoxy) ethanol, diethanolamine, biuret, 1-methyl-2-pyrrolidone, aniline, methylpyrrolidone, morpholine, ethanolamine, hydroxylamine, ethylenediamine, triethylenetetramine, diethylenetriamine, dimethylamine, and methylamine.

Generally, the amines with the lower molecular weights are preferred. The more preferred amines include methylamine, dimethylamine, hydroxylamine, 2-(2-aminoethoxy)ethanol, aniline and morpholine.

The acid component that is used to form the salt of the low molecular weight amine may be an organic acid or a mineral acid. Suitable organic acids include the following: formic, acetic, hydroxyacetic, propionic, oxalic, citric, palmitic, and the like. Suitable mineral acids include the following: hydrochloric, sulfurous, sulfuric and phosphoric.

Preferably, the acid has a low molecular weight, such as hydrochloric, formic, acetic, or hydroxyacetic acids. Hydrochloric acid is especially preferred.

A wetting agent, i.e., a surfactant, may be optionally used in the slurries prepared by the present invention. The function of the surfactant is to speed the wetting of the clay. Although the smectite clay will eventually wet without the surfactant, it will take significantly longer. When present, an effective amount of the surfactant in the aqueous slurry is from about 0.01 to about 0.2 percent by weight of the slurry, typically, from about 0.06 to about 0.1% by weight. Any non-interfering surfactant may be used. Such surfactants are typically non-ionic, such as the polyalkoxylated alcohol sold under the tradename TRITON. A suitable surfactant is TRITON DF-16, which is commercially available from Sigma Chemical Company, St. Louis, Mo.

Optionally, the composition of the present invention may also include less than 15% by weight of the slurry of a low molecular weight polyacrylate polymer. By the term "polyacrylate polymer" as used herein is meant a water soluble or dispersible homopolymer, copolymer, or terpolymer wherein at least one of the monomer units is acrylic acid, methacrylic acid or maleic acid. To facilitate the spacing of the charges, the polyacrylate polymer may also include monomer units of methyl acrylate, ethyl acrylate, and vinyl sulfonic acid. It is also within the scope of the present invention to employ other monomeric units in amounts that do not preclude the water solubility or dispersibility of the polyacrylate polymer.

By the term "low molecular weight polyacrylate polymer," as used herein, is meant a polyacrylate polymer of sufficiently low molecular weight so as to be water soluble or water dispersible. Typically, the mean molecular weight of a suitable low molecular weight polyacrylate polymer is from 1,500 to 15,000 daltons. The polyacrylate polymer contributes to modification of the surface charge on the clay particles. Typically, an effective amount of polyacrylate polymer in the slurry composition of the present invention is 0.1 to about 15% by weight of the smectite slurry.

To facilitate its solubility or dispersibility in water, the polyacrylate polymer is employed in the form of a partially neutralized salt of its carboxylic acid moieties. Preferably, the partially neutralized salt of the polyacrylate polymer is a sodium, potassium, lithium or ammonium salt, or a combination thereof.

DESCRIPTION OF PREFERRED EMBODIMENTS

In a preferred procedure pursuant to the invention the selected amine (or amines) and acid(s) are added to water with mixing, where they react to form the desired amine salt(s). The amine depending on its structure and molecular weight, is commonly available as a liquid, a liquid solution, or as a solid. In each instance the amine should be water soluble or water dispersible. The order of addition of the amine and acid is not critical. The resulting amine salt should likewise be water soluble or at least be water dispersible, so that at least an emulsion is formed. The surfactant (if used) is then added, and the optional polyacrylate polymer. Thereafter, the desired amount of the smectite clay, e.g. a sodium bentonite, is added to and dispersed in the aqueous solution or emulsion. Unlike certain prior art, the clay may be added rapidly and with rapid mixing. The mode of mixing is not critical. Various instrumentalities may be used, including paddle wheel mixing and the like.

TABLES I and II herein reflect various compositions of the present invention. In particular, TABLE I discloses various compositions of the present invention that differ from one another in either the amount or selection of a primary, secondary, tertiary or quaternary amine, and in the presence or absence of a polyacrylate polymer. In TABLE I, the various components of each slurry, i.e., amine, acid (HCl), water, clay, polyacrylate polymer (polymer 9000 (Acumer 9000)), and surfactant (TRITON DF-16), are provided in parts per 100 parts slurry by weight. Acumer 9000 is a low molecular weight polyacrylate polymer that is commercially available from Rohm and Haas Company, Philadelphia, Pa. TRITON DF-16 is a polyalkoxylated alcohol (i.e., non-ionic) wetting agent that is commercially available from Sigma Chemical Co., St. Louis, Mo. For convenience, the amount of TRITON DF-16 is not listed in TABLE I. However, it is present in each slurry from 0.06 to 0.10 parts by weight per 100 parts slurry. The last column of TABLE I reflects stability by reporting the appearance of each composition five days after its preparation. When observed on the fifth day, the appearance of the various compositions ran the continuum from liquid to solid. For purposes of this invention, the best results were obtained with slurries that appeared "liquid" after five days. Slurries that appeared "liquid, weeps" ran close behind. By "weeps" is meant that some water separated from the slurry and was visible as pooling on top. These slurries ("liquid" and "weeps") were amine salt stabilized, high solids, low viscosity bentonite slurries of the present invention.

TABLE I indicates that methylamine hydrochloride provided a high solids, low viscosity bentonite slurry that had 42.9 parts clay by weight, but still remained liquid, and therefore pumpable, after five days.

TABLE II is similar to TABLE I except that TABLE II reflects the effect of various acids on the resulting amine salts' ability to suppress the gelling properties of a high solids bentonite slurry. As already discussed herein, the greatest suppression of gelling generally occurs with the smallest amines and the smallest acids. For example, methylamine with acetic acid (formula weight 60.05) or with propionic acid (formula weight 74.08) provides a "liquid" slurry at 30 parts clay per hundred parts slurry by weight, whereas the same amine (methylamine) with the higher molecular weight acid, palmitic acid (F.W. 256.43) provides a more viscous "paste" slurry at 20.7 parts clay per hundred parts slurry by weight.

TABLE I

AMINE HYDROCHLORIDE SALTS AND BLANKS

| Amine or Amine Salt Reaction: (1 mole amine + 1 mole HCl) | Amine % Purity | Salt Total Parts | Amine STOIC Parts | HCl STOIC Parts | Water AMT. Parts | Clay AMT. Parts | Poly 9000 AMT. Parts | pH FIN | Appearance 5 DAYS |
|---|---|---|---|---|---|---|---|---|---|
| Proset 1810 (DMA + epichlorohydrin polymer) | 50 | 3.1 | — | — | 64.9 | 31.3 | 0.63 | — | Solid |
| Proset 1810 (DMA + epichlorohydrin polymer) | 50 | 1.8 | — | — | 80.3 | 17.5 | 0.35 | 9.0 | Solid Paste |
| Ethox TAM-5 or POE(5) tallow amine | 100 | 6.0 | 5.6 | 1.2 | 62.6 | 30.0 | 0.60 | — | Solid |
| Ethox TAM-5 or POE(5) tallow amine | 100 | 4.6 | 4.3 | 0.9 | 71.3 | 23.0 | 0.46 | 7.7 | Liquid |
| Aliquat 336 or tricaprylmethyl-ammonium chloride | 100 | 6.0 | — | — | 63.3 | 30.0 | 0.60 | — | Solid |
| Aliquat 336 or tricaprylmethyl-ammonium chloride | 100 | 3.8 | — | — | 76.9 | 18.9 | 0.38 | — | Liquid |
| Stepan BTC 99 or Didecyl Dimethylammonium Cl | 50 | 12.0 | — | — | 57.3 | 30.0 | 0.60 | — | Solid |
| Stepan BTC 99 or Didecyl Dimethylammonium Cl | 50 | 6.9 | — | — | 75.5 | 17.2 | 0.34 | 9.3 | Solid Paste |
| bis(2-hydroxyethyl)-tallow amine | 100 | 6.0 | 5.4 | 1.5 | 62.3 | 30.0 | 0.60 | 7.5 | Paste |
| bis(2-hydroxyethyl)-tallow amine | 100 | 4.4 | 4.0 | 1.1 | 72.1 | 22.2 | 0.44 | — | Thixo-tropic Liquid |
| bis(2-hydroxyethyl)-tallow amine | 100 | 4.6 | 4.2 | 1.2 | 70.8 | 23.2 | 0.46 | 7.2 | Liquid |
| POE(2) tallow amine | 100 | 6.0 | 5.4 | 1.6 | 62.3 | 30.0 | 0.60 | | Solid |
| " | 100 | 5.0 | 4.5 | 1.3 | 68.9 | 24.8 | 0.50 | 7.3 | Liquid |
| bis(2-hydroxyethyl)-soyamine | 100 | 6.0 | 5.4 | 1.6 | 62.3 | 30.0 | 0.60 | 7.4 | Paste |
| bis(2-hydroxyethyl)-soyamine | 100 | 4.4 | 4.0 | 1.2 | 72.1 | 22.2 | 0.44 | | Thixo-tropic Liquid |
| bis(2-hydroxyethyl)-soyamine | 100 | 4.6 | 4.2 | 1.2 | 70.8 | 23.2 | 0.46 | 7.3 | Liquid |
| bis(2-hydroxyethyl)-cocoamine | 100 | 6.0 | 5.4 | 1.7 | 62.2 | 30.0 | 0.60 | 8.1 | Solid |
| bis(2-hydroxyethyl)-cocoamine | 100 | 5.1 | 4.6 | 1.4 | 67.7 | 25.6 | 0.51 | | Thixo-tropic Liquid |
| bis(2-hydroxyethyl)-cocoamine | 100 | 5.1 | 4.6 | 1.4 | 68.1 | 25.4 | 0.51 | 8.1 | Liquid |
| Tetrabutylammonium hydroxide | 40 | 6.0 | 14.0 | 2.1 | 53.2 | 30.0 | 0.60 | 8.5 | Liquid |
| 1-Amino-2-Naphthol-4-sulfonic acid | 100 | 6.0 | 5.2 | 2.1 | 61.9 | 30.0 | 0.60 | 5.0 | Purple Paste |
| 1-Amino-2-Naphthol-4-sulfonic acid | 100 | 5.3 | 4.6 | 1.9 | 66.6 | 26.3 | 0.53 | 5.5 | Purple Liquid |
| N-Benzylethanolamine | 99 | 6.0 | 4.9 | 3.2 | 61.3 | 30.0 | 0.60 | 7.5 | Liquid |
| " | 99 | 4.5 | 4.9 | 2.4 | 62.0 | 30.0 | 0.60 | 8.7 | Viscous Liquid |

TABLE I-continued

AMINE HYDROCHLORIDE SALTS AND BLANKS

| Amine or Amine Salt Reaction: (1 mole amine + 1 mole HCl) | Amine % Purity | Salt Total Parts | Amine STOIC Parts | HCl STOIC Parts | Water AMT. Parts | Clay AMT. Parts | Poly 9000 AMT. Parts | pH FIN | Appearance 5 DAYS |
|---|---|---|---|---|---|---|---|---|---|
| Triethanol amine | 99.9 | 6.0 | 4.8 | 3.2 | 61.3 | 30.0 | 0.60 | 7.3 | Liquid |
|  |  |  |  |  |  |  | 0.60 |  | Liquid |
| Methyliminobis-propylamine | 100 | 6.0 | 4.8 | 3.3 | 61.3 | 30.0 | 0.60 | 9.9 | Liquid |
| Hexamethylene-tetramine | 99.4 | 6.0 | 4.8 | 3.3 | 61.2 | 30.0 | 0.60 | 5.9 | Liquid |
| Hexamethylene-tetramine | 99.4 | 4.5 | 4.8 | 2.5 | 62.0 | 30.0 | 0.60 | 5.9 | Liquid |
| Diisopropanolamine | 100 | 6.0 | 4.7 | 3.5 | 61.1 | 30.0 | 0.60 | 7.2 | Liquid |
| 3,3'-Iminobis-propylamine | 100 | 6.0 | 4.7 | 3.5 | 61.1 | 30.0 | 0.60 | 9.9 | Liquid |
| Diisobutylamine | 100 | 6.0 | 4.7 | 3.6 | 61.1 | 30.0 | 0.60 | 7.4 | Liquid |
| 3,3'-Iminobis-propylamine Diisobutylamine | 100 | 5.4 | 4.2 | 3.2 | 55.1 | 36.8 | 0.54 | 7.4 | Liquid |
| 2-(2-aminoethoxy)-ethanol | 100 | 6.0 | 4.5 | 4.2 | 60.7 | 30.0 | 0.60 | 7.4 | Liquid |
| 2-(2-aminoethoxy)-ethanol | 100 | 5.2 | 3.9 | 3.6 | 52.7 | 39.2 | 0.52 | 7.4 | Liquid |
| Diethanol amine | 85 | 6.0 | 5.2 | 4.2 | 59.9 | 30.0 | 0.60 | 8.1 | Liquid |
| Biuret | 100 | 6.0 | 4.4 | 4.2 | 60.6 | 30.0 | 0.60 | 2.7 | Liquid |
| " | 100 | 4.5 | 4.4 | 3.2 | 61.7 | 30.0 | 0.60 | 3.3 | Thixotropic Liquid |
| 1-Methyl-2-Pyrrolidone | 100 | 6.0 | 4.4 | 4.4 | 60.6 | 30.0 | 0.60 | 2.9 | Liquid |
| Aniline, purified | 100 | 6.0 | 4.3 | 4.6 | 60.4 | 30.0 | 0.60 | 4.6 | Liquid |
| Aniline, purified | 100 | 4.5 | 4.3 | 3.4 | 61.6 | 30.0 | 0.60 | 4.6 | Thixotropic Liquid |
| Methyl Pyrrolidone | 100 | 6.0 | 4.4 | 4.4 | 60.6 | 30.0 | 0.60 | 2.7 | Liquid |
| " | 100 | 4.5 | 4.4 | 3.3 | 61.6 | 30.0 | 0.60 | 4.2 | Liquid |
| Morpholine | 100 | 6.0 | 4.2 | 4.8 | 60.3 | 30.0 | 0.60 | 7.0 | Liquid |
| Hydroxylamine Hydrochloride | 98.9 | 6.1 |  |  | 63.2 | 30.0 | 0.60 | 5.9 | Liquid |
| Hydroxylamine Hydrochloride | 98.9 | 5.9 |  |  | 64.5 | 28.9 | 0.58 | 5.9 | Liquid |
| Ethanolamine | 99 | 6.0 | 3.7 | 6.1 | 59.4 | 30.0 | 0.60 | 8.1 | Liquid |
| Ethylenediamine | 100 | 6.0 | 3.7 | 6.1 | 59.4 | 30.0 | 0.60 | 8.3 | Liquid, weeps |
| Triethylenetetramine mix | 100 | 6.0 | 3.6 | 6.5 | 59.2 | 30.0 | 0.60 | 10.0 | Liquid, weeps |
| Diethylenetetramine mix | 100 | 6.0 | 3.6 | 6.6 | 59.1 | 30.0 | 0.60 | 7.0 | Liquid, weeps |
| Dimethylamine | 40 | 6.1 | 8.3 | 7.3 | 63.2 | 30.0 | 0.60 |  | Liquid, weeps |
| " | 40 | 5.1 | 6.9 | 6.1 | 52.7 | 41.7 | 0.50 |  | Liquid, weeps |
| Methylamine | 40 | 6.0 | 6.9 | 8.8 | 53.6 | 30.0 | 0.60 | 7.0 | Liquid |
| " | 40 | 6.0 | 5.8 | 7.3 | 44.7 | 41.7 | 0.50 | 7.5 | Liquid |
| " | 40 | 6.0 | 6.9 | 8.8 | 40.7 | 42.9 | 0.60 |  | Liquid |
| (CH$_3$)$_2$ NH.HCl, parts of salt variations | 99 | 6.1 |  |  | 63.2 | 30.0 | 0.60 |  | Liquid, weeps |
| (CH$_3$)$_2$ NH.HCl, parts of salt variations | 99 | 3.0 |  |  | 66.2 | 30.0 | 0.60 | 8.5 | Liquid |
| (CH$_3$)$_2$ NH.HCl, parts of salt variations | 99 | 1.5 |  |  | 67.7 | 30.0 | 0.60 |  | Paste |
| (CH$_3$)$_2$ NH.HCl, parts of salt variations | 99 | 0.0 |  |  | 69.2 | 30.0 | 0.60 |  | Solid |
| Inorganic Ammonium Salts: |  |  |  |  |  |  |  |  |  |
| Ammonium Phosphate Monobasic | 100 | 6.0 |  |  | 63.3 | 30.0 | 0.60 | 6.5 | Thick Liquid |
| Ammonium Chloride | 100 | 6.0 |  |  | 63.3 | 30.0 | 0.60 | 7.8 | Liquid |
| Ammonium Chloride, maximum clay | 100 | 6.0 |  |  | 54.0 | 39.3 | 0.60 | 7.6 | Thick Liquid |
| Blanks: |  |  |  |  |  |  |  |  |  |
| Maximum Clay |  |  |  |  | 81.0 | 18.3 | 0.60 | 10.1 | Grainy Liquid |
| Maximum Clay |  |  |  |  | 94.9 | 5.0 |  | 9.9 | Grainy Liquid |

PARTS = parts based upon 100 parts by weight of ingredients.
Each composition also contains from 0.35 to 0.60 parts by weight Poly 9000 and from 0.06 to 0.10 parts by weight of TRITON DF-16 wherein the ratio by weight of Poly 9000 to TRITON DF-16 is about 6:1.
POLY 9000 = Acumer 9000 as supplied by Rohm & Haas.
TRITON DF-16 is a polyalkoxylate alcohol surfactant.
CLAY = Bentolite 642 as supplied by Southern Clay Products Inc., Gonzales, Texas.
WEEPS = Some water split on top after standing.

TABLE II

SALTS OF AMINES OTHER THAN HYDROCHLORIDES

| Amine Source | Amine % Act. | Amine Stoich Parts | Acid Stoich Parts | Water Amount Parts | Clay Amount Parts | Poly 9000 Amount Parts | pH FIN | Appearance |
|---|---|---|---|---|---|---|---|---|
| Acetic Acid (F.W. 60.05, 95%) | | | | | | | | |
| Ethox TAM-5, POE (5) tallow amine | 100 | 27.0 | 0.7 | 41.6 | 30.0 | 0.60 | — | Solid |
| Ethox TAM-2, POE (2) tallow amine | 100 | 19.5 | 0.9 | 48.9 | 30.0 | 0.60 | — | Solid Amine |
| Tetrabutylammonium hydroxide [CH$_3$(CH$_2$)$_3$]$_4$OH | 40 | 12.9 | 1.3 | 55.1 | 30.0 | 0.60 | 9.2 | Thick Liquid |
| Ethylenediamine, H$_2$NCH$_2$CH$_2$NH$_2$ | 100 | 3.0 | 3.2 | 63.1 | 30.0 | 0.60 | 9.0 | Liquid |
| Triethylenetriamine mix | 100 | 2.9 | 3.3 | 63.1 | 30.0 | 0.60 | 8.9 | Liquid |
| Diethylenetriamine mix | 100 | 2.8 | 3.4 | 63.1 | 30.0 | 0.60 | 8.3 | Liquid |
| Dimethylamine, (CH$_3$)$_2$NH | 40 | 6.4 | 3.6 | 59.3 | 30.0 | 0.60 | 6.1 | Liquid |
| Methylamine, CH$_3$NH$_2$ | 40 | 4.4 | 4.2 | 60.7 | 30.0 | 0.60 | 6.8 | Liquid |
| Hydroxyacetic acid (F.W. 76.05, 57%) | | | | | | | | |
| Triethylenetetramine mix | 100 | 2.5 | 6.1 | 60.7 | 30.0 | 0.60 | 8.6 | Liquid |
| Diethylenetrimine mix | 100 | 2.5 | 6.2 | 60.6 | 30.0 | 0.60 | 9.1 | Liquid |
| Methylamine, CH$_3$NH$_2$ | 40 | 3.9 | 7.5 | 58.0 | 30.0 | 0.60 | 7.3 | Liquid |
| Propionic acid F.W. 74.08, 99.68% | | | | | | | | |
| Methylamine, CH$_3$NH$_2$ | 40 | 3.9 | 4.2 | 61.1 | 30.0 | 0.60 | 6.9 | Liquid |
| Sulfuric acid (F.W. 98.08, 96.1%) | | | | | | | | |
| Methylamine, CH$_3$NH$_2$ | 40 | 3.3 | 4.7 | 61.3 | 30.0 | 0.60 | 2.3 | Liquid |
| Methylamine, CH$_3$NH$_2$, amine to acid 2:1 | 40 | 5.8 | 3.8 | 59.7 | 30.0 | 0.60 | 8.5 | Liquid |
| Phosphoric acid (F.W. 98.00, 85%) | | | | | | | | |
| Methylamine, CH$_3$NH$_2$ | 40 | 3.3 | 5.4 | 60.7 | 30.0 | 0.60 | 6.0 | Liquid |
| Methylamine, CH$_3$NH$_2$, amine to acid 2:1 | 40 | 5.8 | 4.3 | 59.2 | 30.0 | 0.60 | 8.5 | Liquid |
| Methylamine, CH$_3$NH$_2$, amine to acid 3:1 | 40 | 7.3 | 3.6 | 58.4 | 30.0 | 0.60 | 11.1 | Liquid |
| Palmitic acid (F.W. 256.43, 95%) | | | | | | | | |
| Methylamine, CH$_3$NH$_2$ | 40 | 1.8 | 6.4 | 70.3 | 20.7 | 0.68 | | Paste |
| " | 40 | 1.0 | 3.5 | 83.9 | 11.2 | 0.37 | 10.0 | Light Paste |
| " | 40 | 0.8 | 2.8 | 87.1 | 9.0 | 0.29 | | Fluffy paste |

PARTS = parts based upon 100 parts by weight of ingredients.
Each composition also contains from 0.35 to 0.60 parts by weight Poly 9000 and from 0.06 to 0.10 parts by weight of TRITON DF-16 wherein the ratio by weight of Poly 9000 to TRITON DF-16 is about 6:1.
POLY 9000 = Acumer 9000 as supplied by Rohm & Haas.
TRITON DF-16 is a polyalkoxylate alcohol surfactant.
CLAY = Bentolite 642 as supplied by Southern Clay Products Inc., Gonzales, Texas.
WEEPS = Some water split on top after standing.

TABLE III illustrates that the optional polyacrylate polymer has a very small positive effect on the ability to make the amine salt stabilized high solids bentonite slurries of the present invention.

TABLE III

| Acumer 9000 Sodium polyacrylate (parts) | Dimethylamine hydrochloride (parts) | Maximum Bentonite Solids (parts) |
|---|---|---|
| 0 | 0 | 8 |
| 4 | 0 | 13 |
| 0 | 6 | 45 |
| 15 | 6 | 47 |

In TABLE III, all "parts" represent "parts per hundred parts slurry by weight."

The inhibitory effect on the swelling of bentonite clay by the organic amine salts is reversible as is shown for dimethylamine hydrochloride in TABLE IV. The data for dimethylamine hydrochloride was determined by preparing an aqueous high solids bentonite slurry wherein the amount of bentonite was 37.9 parts per hundred parts per slurry by weight, the amount of dimethylamine hydrochloride was 2.07 parts per hundred parts slurry by weight, and an effective amount of surfactant was used. Aliquots of this slurry were diluted with water with agitation. The resulting dilute slurries were sealed and allowed to sit for 24 hours at which time they were compared to the original.

After 24 hours, the samples diluted with the largest amount of water had the greatest amount of weeping or splitting of excess water from the bentonite layer. The clear liquid on top of the slurry was removed and weighed. This "free water" is regarded as excess water or water that had not been bound by the swelling of the bentonite. The difference between the free water and the amount of dilution water added is a measure of how much additional water is absorbed by the bentonite due to swelling. The percent swelling of the bentonite clay is calculated as follows:

$$\% \text{ Clay Swelling} = \frac{(\text{Dilution Water Added} - \text{Free Water}) \times 100}{\text{Total Weight of Slurry}}$$

For each dilution, the free water, after diluting and settling, was less than the dilution water added to the sample. See TABLE IV. These results indicate that the bentonite layer was holding additional water because of swelling. Swelling was observed to increase with increasing dilution.

TABLE IV

| Original Slurry Weight | Dilution Water Weight | % Bentonite | Free Water Weight (24 Hours) | (Dilution Water − Free Water) | % Clay Swelling |
|---|---|---|---|---|---|
| 500 | 0 | 37.9 | 1.1 | 1.1 | −0.2 |
| 95 | 5 | 36 | 0.6 | 4.4 | 4.6 |
| 90 | 10 | 34.1 | 1 | 9 | 10 |
| 70 | 30 | 26.5 | 4.8 | 25.2 | 36 |
| 150 | 150 | 19 | 66.7 | 83.3 | 55.5 |
| 100 | 200 | 12.6 | 115.9 | 84.1 | 84.1 |
| 100 | 300 | 9.5 | 183.4 | 116.6 | 116.6 |

The efficacy of the invention is fully achieved at even very low levels of the amine salt. This is shown in the series of tests tabularized in Table V, which illustrates both the ease of manufacture and the stabilization of bentonite slurries using a dimethylamine hydrochloride salt to temporarily inhibit the swelling properties of the clay. Moderate solids bentonite slurries were thus prepared using a "Lightning" propeller mixer at moderate speed. All slurries were prepared at the same speed using the same percentage of bentonite solids in the resulting slurries. The sodium polyacrylate level used in the slurry to modify the electrophoretic mobility of the bentonite remained constant in all the tests. The only difference in the prepared suspensions was the level of amine salt.

The slurries were prepared by adding the sodium polyacrylate dispersant to the water for the slurry preparation, followed by the dimethylamine and the hydrochloric acid solution. The Bentolite® 642, a sodium bentonite supplied by Southern Clay Products, Inc. was added over a one minute period. The slurries were observed as they were stirred. Mixing continued until the slurries had a smooth, uniform appearance, with no noticeable lumps of unwetted bentonite.

Tests 1-6 were all extremely easy to prepare, with the bentonite wetting out very quickly and clumps disappearing very rapidly. The resulting bentonite suspensions all settled very fast because the amine salt produced a total, temporary inhibition of swelling of the bentonite. These examples would not be preferred for transport because they settle in the shipping container before arriving at the application site The settled bentonite will, however, go back into suspension rapidly with agitation.

Tests 7-9 exhibit fast wetting and preparation time and form suspensions that are stable or have a slight water separation at the top. These are judged to be acceptable for manufacturing and shipment to an application site. Tests 10-12 exhibit slower wetting and preparation time than the previous tests with the formation of a grainy appearance, which became smooth and uniform with additional agitation. Tests 10-12 were storage stable for 35 days and remained pourable with no agitation.

Tests 13-14 test the effect of minimizing the amount of amine salt. Test 13 wetted slower than the previous examples and became grainy before finally forming a uniform dispersion. Test 13 produced a stable slurry, but it had almost gelled. Test 14 wetted slower than 13 and took longer agitation to form a smooth lump free suspension. Test 14 gelled. The control suspension (untreated with the amine salt) was Test 15. It gave very slow wetting and had lumps of unwetted bentonite for considerably longer than Test 14 before it became uniform. Test 15 gelled on standing. Bentonite slurries that gel (do not pour) are difficult to pump from a shipping container at the point of use, without first agitating the suspension. Gelled suspensions are judged to be unacceptable for present purposes.

TABLE V

| Test No. | Water | Sodium Polyacrylate | HCl 37% | DMA 40% | Amine Salt | Bentolite 642 | % Amine Salt on Bentonite | Preparation Wetting Speed % Slurry Appearance | Appearance 35 days Not Agitated |
|---|---|---|---|---|---|---|---|---|---|
| 1 | 82.90 | 1.69 | 2.41 | 2.76 | 2.00 | 10.24 | 19.49% | Instantaneous, no lumps | Separates Quickly |
| 2 | 83.93 | 1.69 | 1.93 | 2.21 | 1.60 | 10.24 | 15.61% | Very fast wetting, no lumps | Separates Quickly |
| 3 | 84.76 | 1.69 | 1.54 | 1.77 | 1.28 | 10.24 | 12.48% | Very fast wetting, no lumps | Separates Quickly |
| 4 | 85.43 | 1.69 | 1.23 | 1.41 | 1.02 | 10.24 | 9.95% | Very fast wetting, no lumps | Separates Quickly |
| 5 | 85.95 | 1.69 | 0.99 | 1.13 | 0.82 | 10.24 | 7.99% | Fast wetting, small amount on walls | Separates Quickly |
| 6 | 86.38 | 1.69 | 0.79 | 0.90 | 0.65 | 10.24 | 6.37% | Fast wetting, small amount on walls | Separates Slowly |
| 7 | 86.72 | 1.69 | 0.63 | 0.72 | 0.52 | 10.24 | 5.09% | Fast wetting, small amount on walls | Slight Separation |
| 8 | 86.98 | 1.69 | 0.51 | 0.58 | 0.42 | 10.24 | 4.11% | Fast wetting, small amount on walls | Very slight separation |
| 9 | 87.21 | 1.69 | 0.40 | 0.46 | 0.33 | 10.24 | 3.24% | Fast wetting, small amount on walls | Stable, pours OK |
| 10 | 87.38 | 1.69 | 0.32 | 0.37 | 0.27 | 10.24 | 2.60% | Moderate wetting rate, grainy before getting smooth | Stable, pours OK |
| 11 | 87.42 | 1.69 | 0.32 | 0.33 | 0.25 | 10.24 | 2.45% | Moderate wetting rate, grainy before getting smooth | Stable, pours OK |
| 12 | 87.51 | 1.69 | 0.26 | 0.30 | 0.22 | 10.24 | 2.11% | Moderate wetting rate, grainy before getting smooth | Stable, moves very slowly |
| 13 | 87.71 | 1.69 | 0.17 | 0.19 | 0.14 | 10.24 | 1.36% | Moderate to slow, grainy before getting smooth | Stable, doesn't pour |
| 14 | 87.84 | 1.69 | 0.11 | 0.12 | 0.09 | 10.24 | 0.87% | Slow wetting, but much faster than water only | Stable, gelled |
| 15 | 88.07 | 1.69 | 0.00 | 0.00 | 0.00 | 10.24 | 0.00% | Very slow wetting, lumps, long time to become uniform | Stable, gelled |

The sodium polyacrylate used was Accumer 9000, as supplied by Rohm & Haas.
Bentolite 642 is a sodium bentonite clay supplied by Southern Clay Products.
Slurries were prepared with a Lightning propeller mixer, run at moderate speed. The agitation rate was the same for all samples.
Acceptable products must be easily produced and remain stable and flowable after storage.

While the present invention has been set forth in terms of specific embodiments thereof, it will be appreciated in view of the foregoing disclosure, that numerous variations upon the invention are now enabled to those skilled in the art, which variations yet reside within the scope of the invention. For example, it is also within the scope of the present invention that the amine salt be selected to suit a particular application. Thus, in certain instances, the amine that is most effective at suppressing the viscosity of a bentonite slurry is not always chosen. For example, the salt of a fatty amine with a mineral acid may be used to render the bentonite more hydrophobic. The solids level of the slurry would necessarily have to be lower than if prepared with the optimal low molecular weight amine salts. However, the maximal solids content is sacrificed to provide a high solids, low viscosity bentonite suspension having distinct end use properties. By selecting an amine salt having properties suited for a particular end use, e.g., polar, non-polar, etc., one can use the method of the present invention to form compositions of the present invention that are customized to a particular end-users requirements. Such (amine salt) customized high solids, low viscosity bentonite slurries would exhibit viscosities that increased upon dilution.

Accordingly, the invention is to be broadly construed, and limited only by the scope and spirit of the claims now appended hereto.

What is claimed is:

1. An aqueous smectite clay slurry, comprising an aqueous solution or emulsion of at least 0.2% by weight of said slurry of a salt of a primary, secondary, tertiary or quaternary amine having a molecular weight within the range of about 31 to about 500 daltons, in which is dispersed from about 10 to 47% by weight of said slurry, of a smectite clay; said amine salt being effective to prevent said smectite clay from swelling appreciably, and to prevent gelling of the slurry, whereby the slurry can be shipped and stored without creating a gelling problem; and any effect of said salt to prevent said swelling of the smectite clay and to prevent said gelling of said slurry being reversible upon subsequent dilution with water.

2. An aqueous slurry in accordance with claim 1, wherein said slurry is time-stable and is pumpable; and wherein the quantity of said amine salt is below that at which the time stability of the slurry becomes appreciably impaired.

3. An aqueous slurry in accordance with claim 2, wherein said amine salt is present in the range of 0.2 to about 5% by weight of said slurry.

4. An aqueous slurry in accordance with claim 1, wherein the smectite clay is a bentonite.

5. An aqueous slurry in accordance with claim 1, wherein said smectite clay has been modified by surface treatment with a water soluble polymer having a molecular weight of 1,000 to 100,000 daltons and a charge density of 4 to 24 meq/g.

6. An aqueous slurry in accordance with claim 1, further comprising up to 0.2% by weight of the slurry, of a wetting agent.

7. An aqueous slurry in accordance with claim 1, wherein said amine is selected from the group consisting of ethoxylated tallow amine, bis(2-hydroxyethyl) soyamine, bis(2-hydroxyethyl)cocamine, tributylamine, N-benzylethanolamine, triethanolamine, methyliminobispropylamine, hexamethylenetetramine, diisopropylamine, 3,3'-iminobispropylamine, diisobutylamine, 2-(2-aminoethoxy) ethanol, diethanolamine, biuret, 1-methyl-2-pyrrolidone, aniline, methylpyrrolidone, morpholine, ethanolamine, hydroxylamine, ethylenediamine, triethylenetetramine, diethylenetriamine, dimethylamine and methylamine.

8. An aqueous slurry in accordance with claim 7, further containing 0.1 to 15% polyacrylate polymer by weight of said slurry, said polyacrylate polymer having an average molecular weight from 1,500 to 15,000 daltons.

9. An aqueous slurry in accordance with claim 8, wherein said amine is selected from the group consisting of methylamine, dimethylamine, hydroxylamine, 2-(2-aminoethoxy)ethanol, aniline and morpholine.

10. An aqueous slurry in accordance with claim 9, wherein said salt is that of an acid selected from the group consisting of hydrochloric acid, sulfurous acid, sulfuric acid, phosphoric acid, formic acid, acetic acid, hydroxyacetic acid, propionic acid, oxalic acid and citric acid.

11. An aqueous slurry in accordance with claim 10, wherein said acid is selected from the group consisting of hydrochloric acid, formic acid, acetic acid and hydroxyacetic acid.

12. An aqueous clay slurry in accordance with claim 10, wherein the smectite clay content is 30 to 47% by weight of said slurry.

13. An aqueous clay slurry in accordance with claim 11, wherein the smectite clay content is 30 to 47% by weight of said slurry.

14. An aqueous clay slurry in accordance with claim 13, wherein the smectite clay content is 40 to 47% by weight of said slurry.

15. An aqueous slurry in accordance with claim 6, wherein the wetting agent is a non-ionic surfactant.

16. An aqueous slurry in accordance with claim 15, wherein the non-ionic surfactant is a polyalkoxylated alcohol.

17. A method for producing an aqueous smectite clay slurry, comprising:

preparing an aqueous solution or emulsion of a salt of a primary, secondary, tertiary or quaternary amine having a molecular weight within the range of about 31 to about 500 daltons, wherein said salt comprises at least 0.2% by weight of said slurry, and dispersing therein at least 10% by weight of a powdered smectite clay; said salt being effective to prevent said smectite clay from swelling appreciably, and to prevent gelling of the slurry, whereby the slurry can be shipped and stored without creating a gelling problem; and any effect of said salt to prevent said swelling of the smectite clay and to prevent said gelling of said slurry being reversible upon subsequent dilution with water.

18. A method in accordance with claim 17, wherein said amine salt is present in the range of 0.2 to about 5% by weight of said slurry.

19. A method in accordance with claim 17, wherein said aqueous salt solution or emulsion is prepared as an initial step, and said smectite clay powder is then added thereto with mixing.

20. A method in accordance with claim 19, wherein said smectite clay is a sodium bentonite, which is added to said solution or emulsion in the amount in the range of from 10 to 47% by weight of said slurry.

21. A method in accordance with claim 19, further including adding to said slurry up to 0.2% by weight of said slurry, of a wetting agent.

22. A method in accordance with claim 21, wherein said aqueous solution or emulsion further contains from 0.2 to 15% by weight of said slurry of a polyacrylate polymer having an average molecular weight from 1,500 to 15,000 daltons.

23. A method in accordance with claim 22, wherein said amine is selected from the group consisting of: ethoxylated tallow amine, bis (2-hydroxyethyl) soyamine, bis(2-hydroxyethyl)cocomine, tributylamine, N-benzylethanolamine, triethanolamine, methyliminobispropylamine, hexamethylenetetramine, diisopropylamine, 3,3'-iminobispropylamine, diisobutylamine, 2-(2-aminoethoxy) ethanol, diethanolamine, biuret, 1-methyl-2-pyrrolidone, aniline, methylpyrrolidone, morpholine, ethanolamine, hydroxylamine, ethylenediamine, triethylenetetramine, diethylenetriamine, dimethylamine and methylamine.

24. A method in accordance with claim 23, wherein said amine is selected from the group consisting of methylamine, dimethylamine, hydroxylamine, 2-(2-aminoethoxy)ethanol, aniline and morpholine.

25. A method in accordance with claim 24, wherein said salt is that of an acid selected from the group consisting of hydrochloric acid, sulfurous acid, sulfuric acid, phosphoric acid, formic acid, acetic acid, hydroxyacetic acid, propionic acid, oxalic acid and citric acid.

26. A method in accordance with claim 23, wherein said acid is selected from the group consisting of hydrochloric acid, formic acid, acetic acid and hydroxyacetic acid.

27. A method in accordance with claim 26, wherein said powdered smectite clay is present in an amount of from 30 to 47% by weight.

28. A method in accordance with claim 27, wherein said powdered smectite clay is present in an amount of from 40 to 47% by weight.

29. A method for shipping a swellable smectite clay from a shipping point to a utilization point, and providing at the utilization point an aqueous swelled smectite clay slurry, comprising the steps of preparing at said shipping point, a slurry comprising an aqueous solution or emulsion of at least 0.2% by weight of the slurry of a salt of a primary, secondary, tertiary or quaternary amine having a molecular weight within the range of about 31 to about 500 daltons, in which is dispersed at least 10% by weight of a powdered smectite clay; said salt being effective to prevent said smectite clay from swelling appreciably, and to prevent gelling of the slurry, whereby the slurry can be shipped and stored without creating a gelling problem; and any effect of said salt to prevent said swelling of the smectite clay and to prevent said gelling of said slurry being reversible upon subsequent dilution with water; shipping said slurry to said utilization point; and activating and swelling the smectite clay at the utilization point by diluting the slurry with fresh water or an aqueous cellulosic suspension.

30. A method in accordance with claim 29, wherein said smectite clay is a sodium bentonite, which is present in the slurry in the amount in the range of from 10 to 47% by weight of the slurry.

31. A method in accordance with claim 30, wherein the dilution of the slurry at the utilization point produces a swellable smectite clay having a solids content in the range of 0.01 to 10%.

32. A method in accordance with claim 30, wherein said sodium bentonite is present in the range of from 30 to 47% by weight.

33. A method in accordance with claim 32, wherein dilution of said slurry is effected by adding the slurry to an aqueous cellulosic suspension.

* * * * *